(12) United States Patent
Evitt

(10) Patent No.: US 9,546,675 B2
(45) Date of Patent: Jan. 17, 2017

(54) CONNECTOR FOR USE IN DISPLAY SYSTEMS

(71) Applicant: Jonathan Henry Strevens Evitt, London (GB)

(72) Inventor: Jonathan Henry Strevens Evitt, London (GB)

(*) Notice: Subject to any disclaimer, the term of this patent is extended or adjusted under 35 U.S.C. 154(b) by 0 days.

(21) Appl. No.: 14/581,808

(22) Filed: Dec. 23, 2014

(65) Prior Publication Data
US 2015/0110550 A1     Apr. 23, 2015

Related U.S. Application Data

(63) Continuation of application No. 12/515,823, filed as application No. PCT/GB2007/004377 on Nov. 19, 2007.

(51) Int. Cl.

| F16B 21/02 | (2006.01) |
|---|---|
| F16B 21/09 | (2006.01) |
| A47B 47/00 | (2006.01) |
| E04B 1/58 | (2006.01) |
| F16B 7/04 | (2006.01) |
| E04B 1/19 | (2006.01) |

(52) U.S. Cl.
CPC .............. *F16B 21/09* (2013.01); *A47B 47/005* (2013.01); *A47B 47/0016* (2013.01); *E04B 1/5831* (2013.01); *F16B 7/048* (2013.01); *F16B 7/0426* (2013.01); *E04B 1/1912* (2013.01); *Y10T 403/7007* (2015.01)

(58) Field of Classification Search
USPC   403/170–176, 178, 217, 218, 348, 403/349, 403/350; 446/108, 204; 52/655.1, 655.2
See application file for complete search history.

(56) References Cited

U.S. PATENT DOCUMENTS

| 3,834,549 A | 9/1974 | Burg et al. |
|---|---|---|
| 3,982,841 A | 9/1976 | Endzweig |
| 4,012,153 A | 3/1977 | Pidgeon et al. |
| 4,065,890 A | 1/1978 | Fenner |
| D257,366 S | 10/1980 | Gabriel |
| 4,646,503 A | 3/1987 | Brullmann et al. |

(Continued)

FOREIGN PATENT DOCUMENTS

| EP | 0187100 | 7/1986 |
|---|---|---|
| WO | 9922834 | 5/1999 |

OTHER PUBLICATIONS

International Search Report from corresponding PCT/GB2007/004377, dated Mar. 26, 2008.

*Primary Examiner* — Joshua Kennedy
(74) *Attorney, Agent, or Firm* — Donald E. Stout; Stout, Uxa & Buyan, LLP

(57) ABSTRACT

A connector, for display systems having a display frame formed of a plurality of beams (1), has a male fitting (3) which has a stem (8) projecting from a plate (4), and a head (9) formed of four noses which project laterally from the stem. The head (9) is inserted in a correspondingly-shaped aperture of a female node fitting and rotated into positive engagement with the inner face of the node fitting. The trailing faces of the four noses have oppositely-inclined ramps which act to provide progressive tightening and alignment of the connector as the male part is rotated within the aperture. The connector provides a stable joint and enables a firm connection to be obtained with a smaller angle of rotation and reduced engagement force.

20 Claims, 5 Drawing Sheets

(56) References Cited

U.S. PATENT DOCUMENTS

| | | | |
|---|---|---|---|
| 4,766,712 | A | 8/1988 | Hale |
| 4,932,916 | A | 6/1990 | Blickle |
| 5,690,446 | A | 11/1997 | Poissant et al. |
| 6,044,990 | A | 4/2000 | Palmeri |
| 6,302,617 | B1 * | 10/2001 | Rumpp .................. B60D 1/52 285/401 |
| 6,595,825 | B1 | 7/2003 | De Wilde |
| 6,622,447 | B1 | 9/2003 | Kessler |
| 6,966,813 | B2 | 11/2005 | Donahue |
| 6,969,211 | B2 | 11/2005 | Altman |
| 7,481,692 | B2 | 1/2009 | Bruder |
| 7,491,025 | B2 | 2/2009 | Tangeman et al. |
| 7,537,409 | B2 | 5/2009 | Huhnerbein |
| D600,291 | S | 9/2009 | Christensen et al. |
| D614,481 | S | 4/2010 | Lewis |
| 8,177,455 | B2 | 5/2012 | Zirin et al. |
| 2008/0267696 | A1 | 10/2008 | De Wilde |

\* cited by examiner

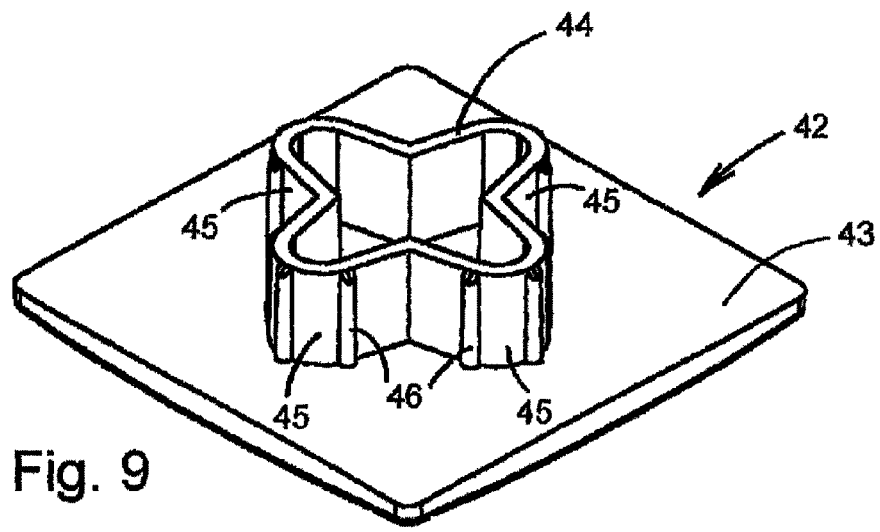
Fig. 9
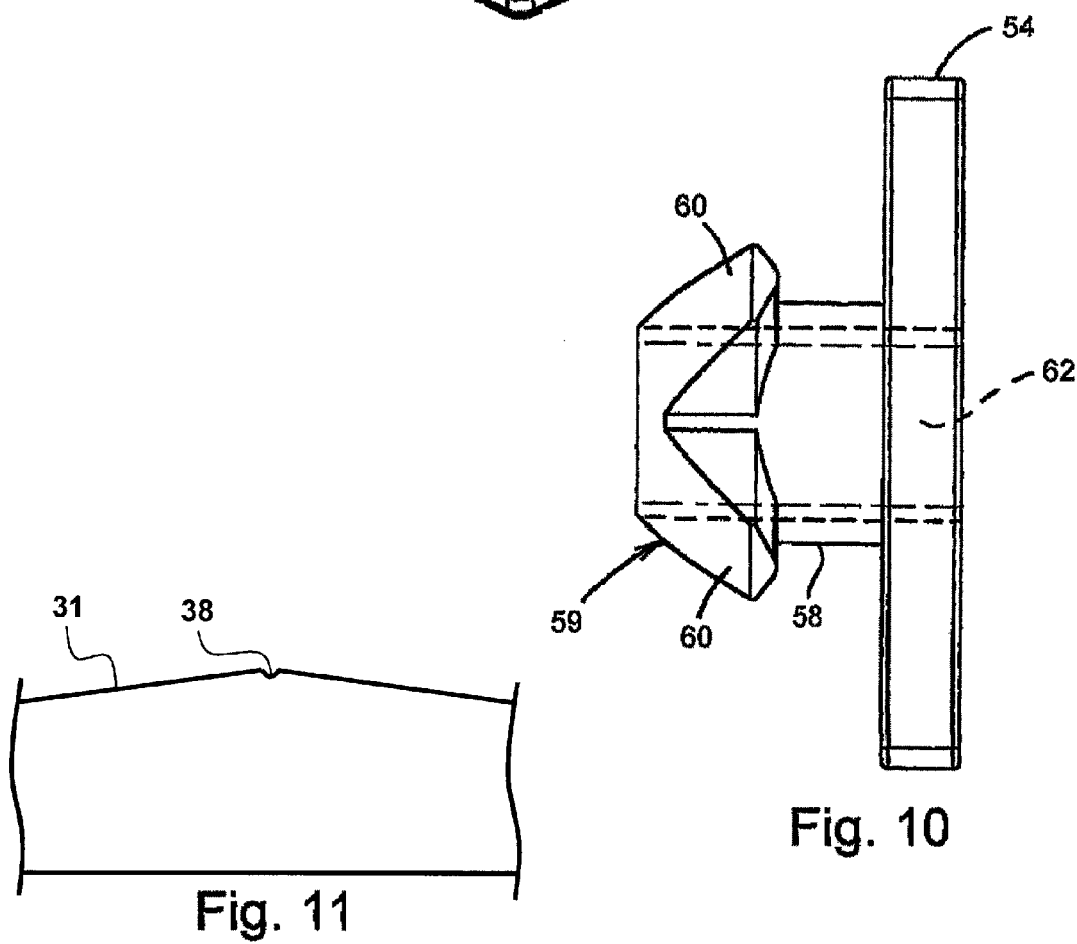
Fig. 10
Fig. 11

CONNECTOR FOR USE IN DISPLAY SYSTEMS

This application is a continuation application under 35 U.S.C. 120 of U.S. application Ser. No. 12/515,823, entitled Connector for Use in Display Frames and filed on Sep. 14, 2011, presently pending, which in turn is a national stage application under 35 U.S.C. 371 of International Application No. PCT/GB2007/004377. The entire contents of these prior applications are expressly incorporated by reference herein.

TECHNICAL FIELD OF THE INVENTION

This invention relates to displays of the kind which include a display frame formed of a plurality of beams which are joined together by multi-way node fittings to form a three-dimensional shape, and in which display panels are releasably secured to the beams.

BACKGROUND

In known displays of this kind the ends of the beams are provided with male bayonet fittings which are inserted into the female node fittings. The bayonet part of the fitting is substantially T-shaped. The cross-piece of the T is inserted through an elongate aperture in the female part and rotated through 90° into a detent position to releasably lock the beam to the node fitting. Whilst such connectors have been used successfully for many years the existing system has been found to possess a number of shortcomings.

1. During construction of the display considerable attention must be paid to the orientation of the node fittings and beams to ensure that they all interconnect in the desired manner. This takes up a considerable amount of time and pre-planning, and requires skill and experience on the part of the display erectors.

2. In order to ensure that a tight rigid joint is achieved the connectors must be designed such that a significant amount of force is necessary to rotate the bayonet fitting. Furthermore, if the connectors should become worn or damaged following a prolonged period of use the connection could become slack, reducing the overall stability of the display frame.

3. It is not immediately obvious whether the beams are securely attached to the node fittings since the external appearance is very similar whether the beams are rotated into the locking position or not.

4. The requirement to rotate the beams through a relatively large angle is sometimes difficult when access is restricted.

5. The weight of the display is attaining greater significance with the need to reduce transportation costs and ensure greater public safety. Although the existing system uses aluminum extruded beams it is necessary to fix steel tape on at least two sides of the beam to which the display panels can be magnetically attached.

U.S. Pat. No. 4,646,503 discloses a display connector in which the male bayonet fitting has a cruciform (cross-shaped) head which is rotatably inserted into a square aperture in the female node fittings. The joint is tightened by means of locking wedges which are operated by means of jackscrews. Although this requires a smaller angle of rotation with a minimum amount of force a secure joint is only achieved if the jack screws are adequately tightened, and there is no visual indication that this has been done. Furthermore, a large number of components are required, making the system expensive and unreliable.

The present invention seeks to provide a new and inventive form of connector for use in the construction of such displays which avoids the above disadvantages, reducing the need for consideration and pre-planning of the build, reducing the overall construction time, minimizing the weight, and generally increasing the ease of construction.

SUMMARY OF THE INVENTION

The present invention proposes a connector for use in displays of the kind which include a display frame formed of a plurality of beams which are joined together by multi-way node fittings to form a three-dimensional shape, and display panels are releasably secured to the beams, in which the said connector comprises:

a male part having a bearing face, a stem projecting from the bearing face, and a head comprising four noses which project laterally from the stem; and a female part having a wall with an inner face and an outer bearing face, the wall containing an aperture which permits the head of the male part to pass through the aperture and rotatably receives the stem with the bearing face of the male part in contact with the outer bearing face of the wall, the inner face of the wall being profiled to engage the said noses when the male part is rotated within the aperture; characterized in that the aperture of the female part is of cruciform shape, and the opposing faces of the wall and the noses are provided with oppositely inclined ramps which act to provide progressive tightening and alignment of the connector as the male part is rotated within the aperture.

In one form of the connector the bearing face of the male part is provided by a plate adapted to engage an end of a beam forming part of the display frame. In another form of the connector the stem contains a screw-threaded socket which opens through the plate to receive a screw-threaded element.

The female part generally includes a plurality of walls which each contain such an aperture. The invention also provides a cap for engagement with any unused apertures of the female part.

BRIEF DESCRIPTION OF THE DRAWINGS

The following description and the accompanying drawings referred to therein are included by way of non-limiting example in order to illustrate how the invention may be put into practice. In the drawings:

FIG. 9 is rear view of the cap; and

FIG. 10 is a side view of a second form of node fitting which permits the attachment of different accessories to the node fittings.

FIG. 11 is a partial section view illustrating ramps formed on the inside face of the node fitting.

DETAILED DESCRIPTION OF THE DRAWINGS

Figure 1:
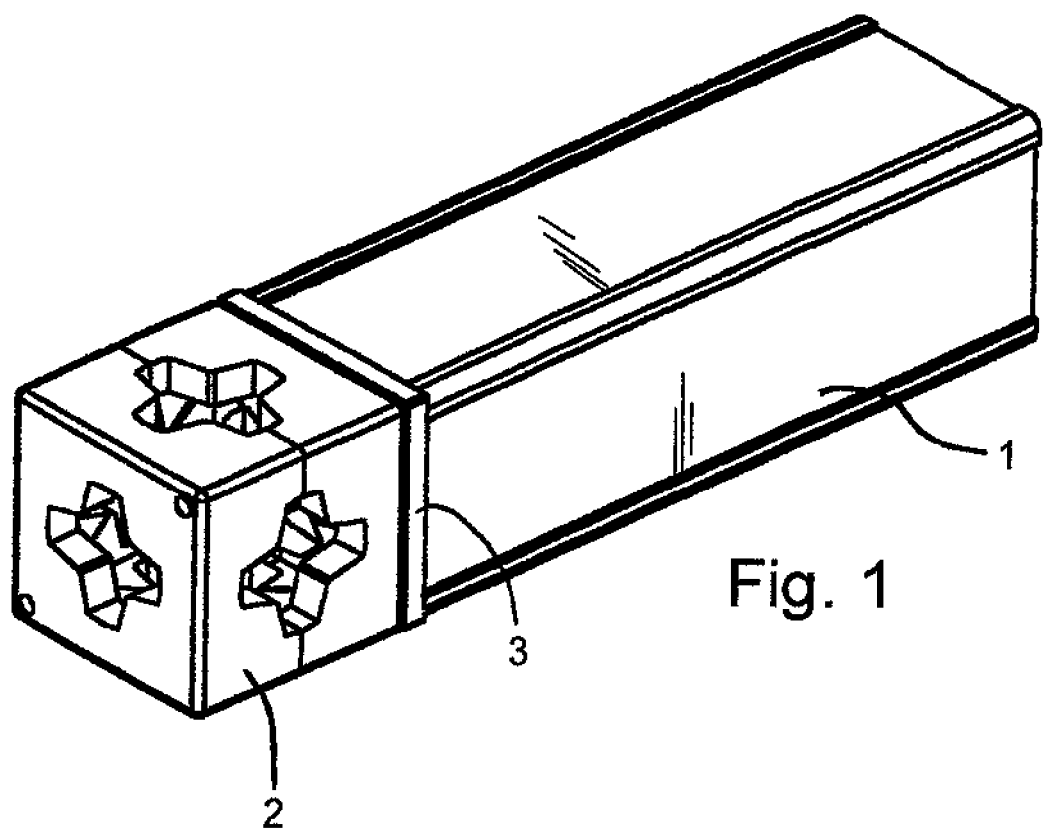
FIG. 1 is a general view of part of a display which comprises a connector in accordance with the invention.

The two-part connector which is shown in FIG. 1 is intended for use in temporary or semi-permanent displays of the kind which are often erected at exhibitions, in foyers or in other public places. The display is based on a display frame formed of extruded beams 1 which are joined together by multi-way node fittings 2 to form a three-dimensional shape to which display panels (not shown) are releasably secured using magnetic strips or the like. The ends of the beams 1 are provided with male end fittings 3 which releasably engage the female node fittings 2. The node fittings are essentially cuboidal so that they are each adapted to engage up to six male fittings, one on each face, allowing up to six beams to be orthogonally secured to each node fitting. In this way, complex three-dimensional structures can be constructed.

Figure 2:
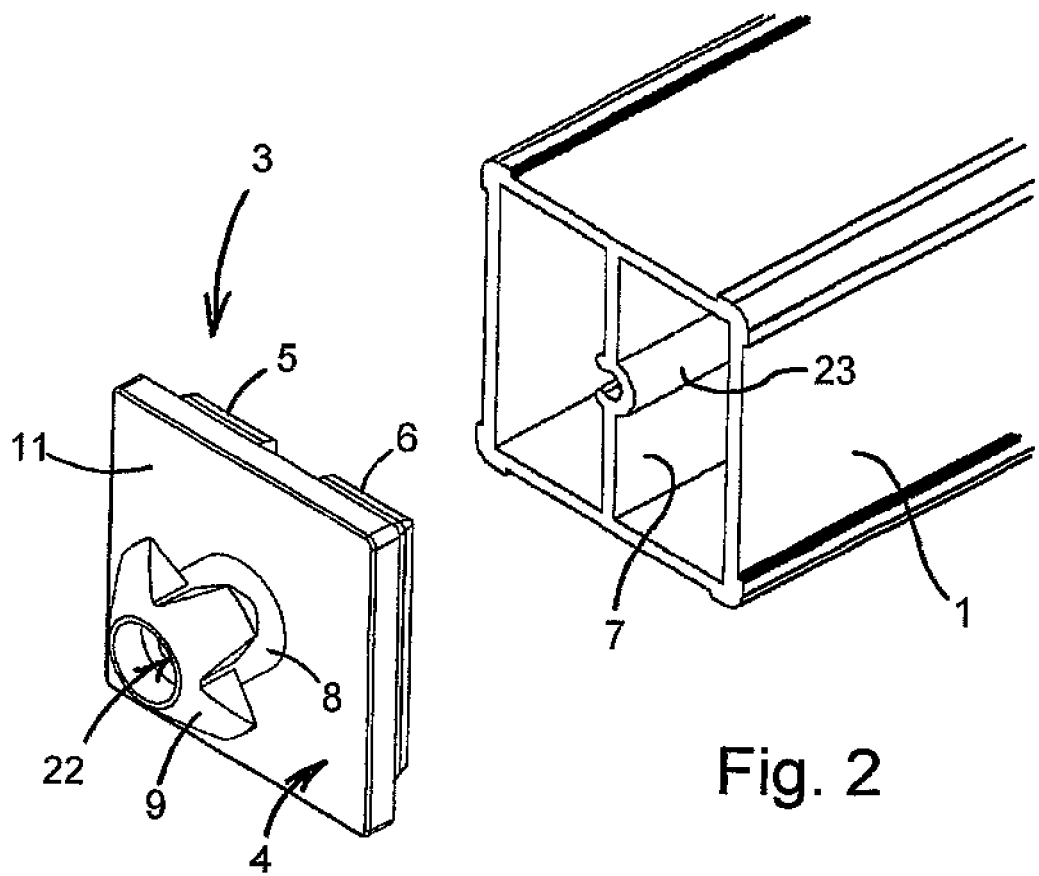
FIG. 2 is a general view of a male fitting forming one part of the connector, together with its associated beam.
Figure 3:
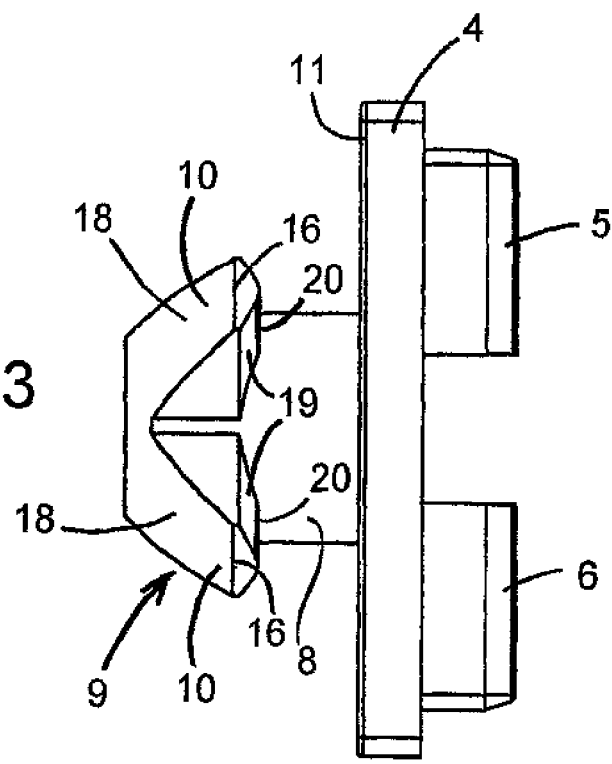
FIG. 3 is a plan view of the male fitting.
Figure 4:
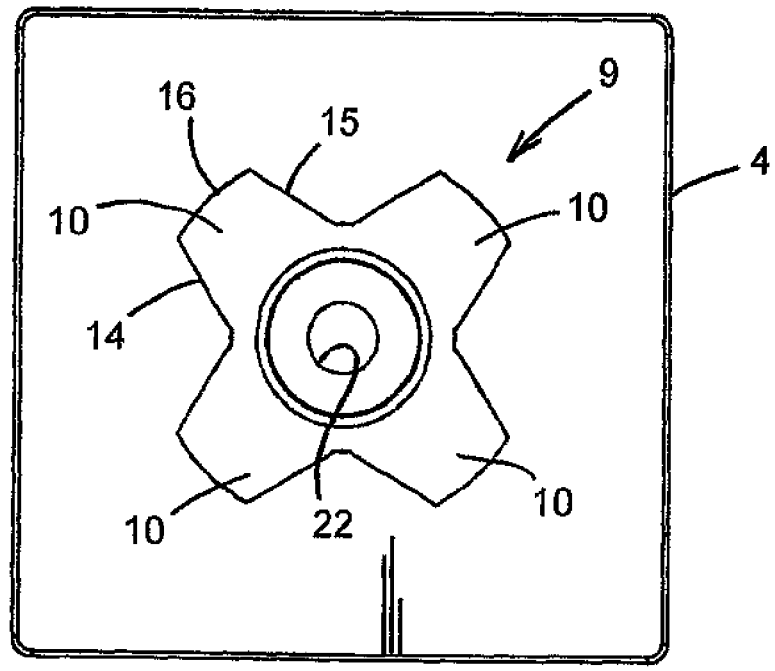
FIG. 4 is an end view of the male fitting.

One of the end fittings 3 is shown in greater detail in FIG. 2, separated from its associated beam 1, and in FIGS. 3 and 4. The end fitting is typically molded of thermoplastic material and includes an end plate 4 which is of substantially the same external cross-sectional profile as the beam 1, i.e. square in this example. One face of the end plate 4 is provided with projections 5 and 6 to locate within the open end of the beam 1 on opposite sides of a central web 7. An opposite bearing face 11 of the end plate 4 is formed with a cylindrical stem 8 projecting axially from the center of the plate, which in turn carries a cruciform head 9. The head 9 comprises four identical noses 10 which project radially from the stem 8 on the diagonals of the end plate 4, with only a small intervening circumferential separation between the noses. When viewed in end elevation as in FIG. 4, the opposite side faces 14 and 15 of each nose 10 converge slightly away from the stem 8 to meet a circumferential outer edge 16. When seen in side elevation as in FIG. 3, the leading face 18 of each nose is inclined towards the end plate 4, from the stem 8 to the outer edge 16. The opposite trailing face 19 of the nose is formed in a shallow V to provide a shallow radially-extending locating ridge 20 which extends substantially parallel to the end plate 4.

Referring to FIG. 2, the male fittings 3 may be secured to the beams 1 in any convenient manner, e.g. by a self-tapping screw inserted through an axial bore 22 passing through the center of the stem 8 and engaged in an axial channel 23 which is included in the web 7.

Figure 5:
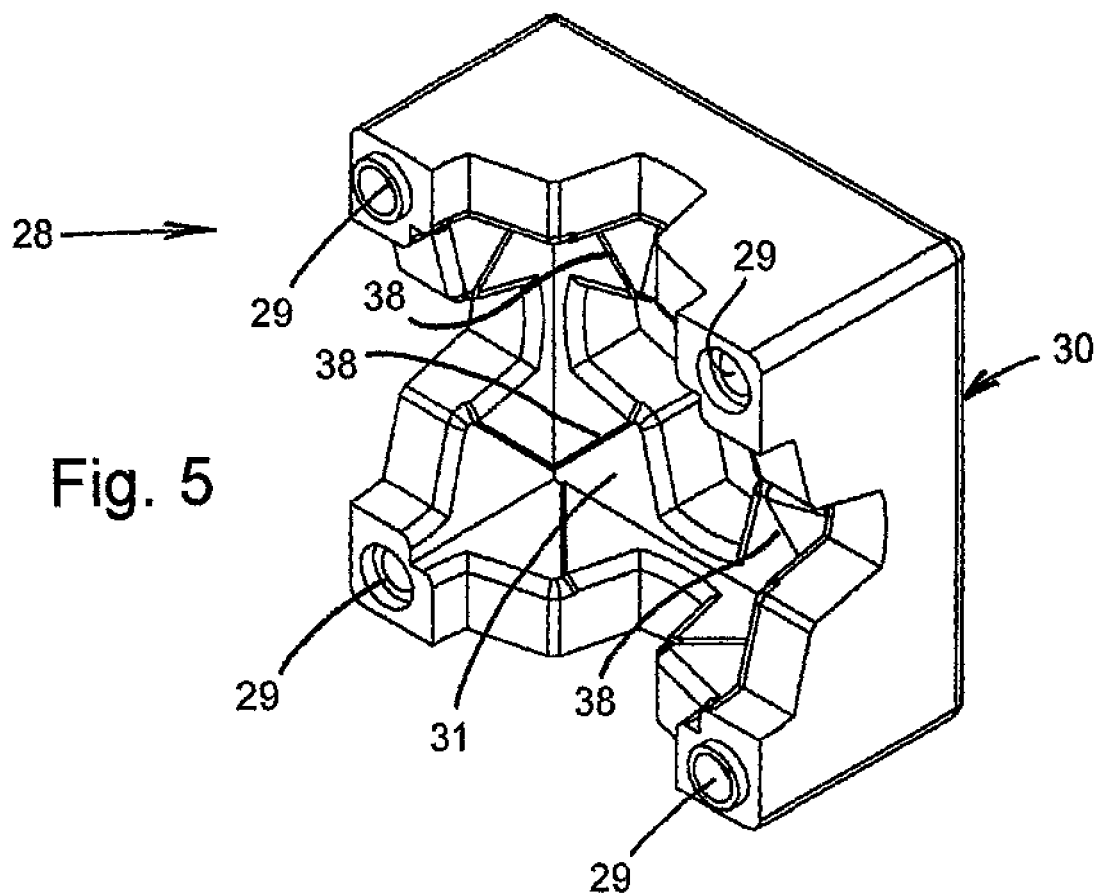
FIG. 5 is a general view of one half of a female node fitting forming a second part of the connector, showing its internal profile.
Figure 6:
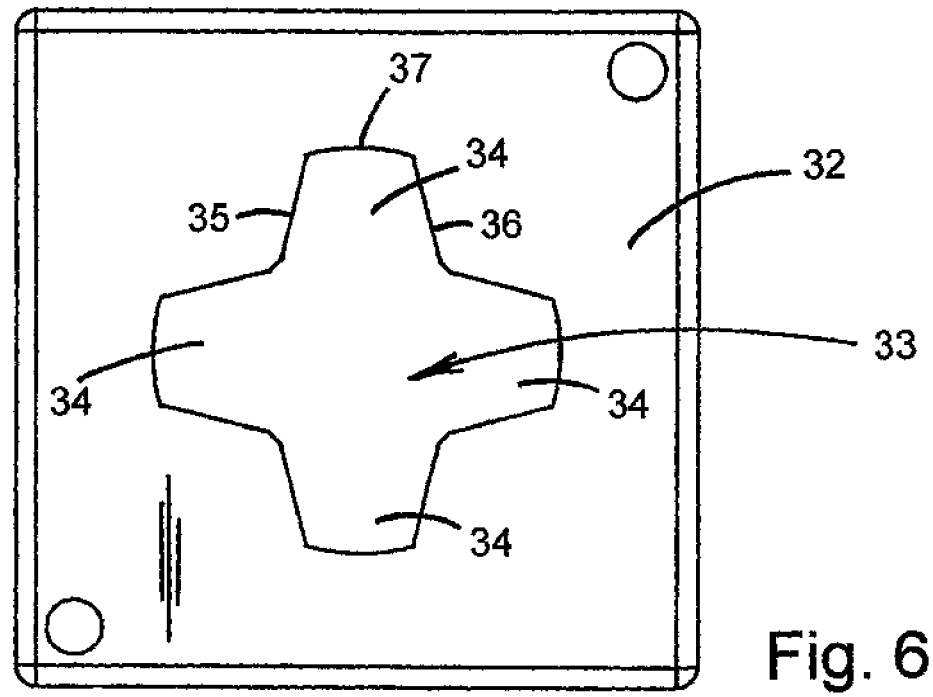
FIG. 6 is a side elevation of the node fitting.

The node fittings 2 may also be molded of thermoplastic. For ease of molding, the node fittings may be formed in two identical halves 28, one of which is shown in FIG. 5, which may be joined together by welds or by screws, pins or other fastening elements inserted through co-operating holes 29, for example. The assembled node fitting is hollow with six square and substantially identical side walls 30. Each side wall provides an inner face 31 and an opposite outer bearing surface 32, shown in FIG. 6. The side wall contains a central generally cruciform aperture 33 which is shaped to permit the head of the male part to pass through. More particularly, the aperture 33 has four substantially identical lobes 34 which project generally perpendicular to the four surrounding side faces of the node fitting, the opposite side margins 35 and 36 of each lobe converging to meet a circumferential outer margin 37. Referring back to FIG. 5, the inner face 31 is provided with four shallow grooves 38 which extend substantially diagonally from the junction of each pair of lobes to the corner of the respective side wall.

Figure 7:
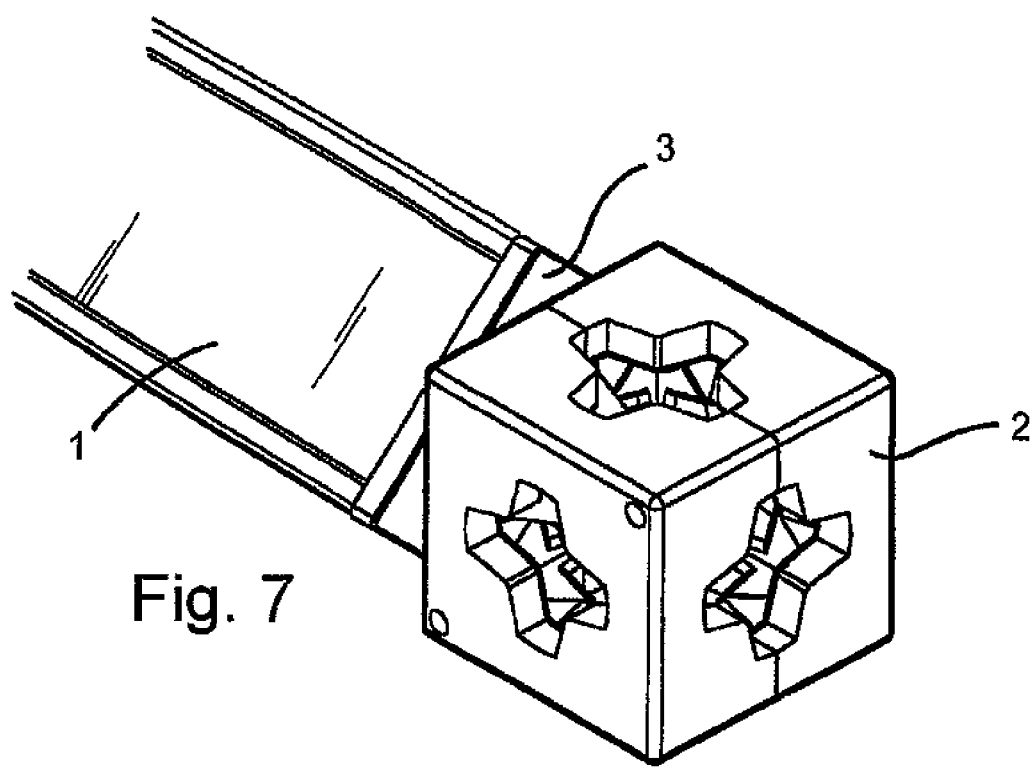
FIG. 7 is a general view of the connector during insertion of the male fitting into the node fitting.

To engage one of the beams 1 with a node fitting 2 the beam is offered up to a side wall of the node fitting in the orientation shown in FIG. 7 so that the head 9 of the male fitting can be inserted into the corresponding aperture 33 of the node fitting. When the end plate 4 contacts the outer bearing face 32 the beam is rotated through 45° into the position shown in FIG. 1, so that the four noses 10 slide against the inner face of the node fitting until the four ridges 20 click into the grooves 38 indicating that a positive lock has been achieved.

The shallow V-shaped configuration of the trailing face 19 provides a pair of oppositely-inclined ramps on opposite sides of the radial locating ridge 20, which act to provide progressive tightening and alignment of the connector as the male part is rotated within the aperture 33. Initially only a small rotational force is necessary, but the necessary force increases towards the end of rotation when the ridges 20 click into the grooves 38. Similar oppositely-inclined ramps may be formed on the inside face 31 of the node fitting leading into the grooves 38 (see FIG. 11), but these would generally be much shallower than the ramps provided on the trailing face of the male fitting. The male fitting can of course be rotated in either direction to engage the node fitting.

The positive engagement of the four noses with the inner face of the node fitting provides the joint with greater stability and enables a firm connection to be obtained with a smaller angle of rotation and reduced engagement force. The strength of joint is less dependent on manufacturing tolerances and the connection is less likely to become slack due to wear or damage. Furthermore, since there is a choice of four possible beam orientations, if aluminum or other non-magnetic extrusions are used it is only necessary to affix steel tape to one side of the beam since the tape-covered side can be rotated into the desired position prior to engagement with the node connectors. This enables a significant reduction in manufacturing time, weight and cost to be achieved.

Figure 8:
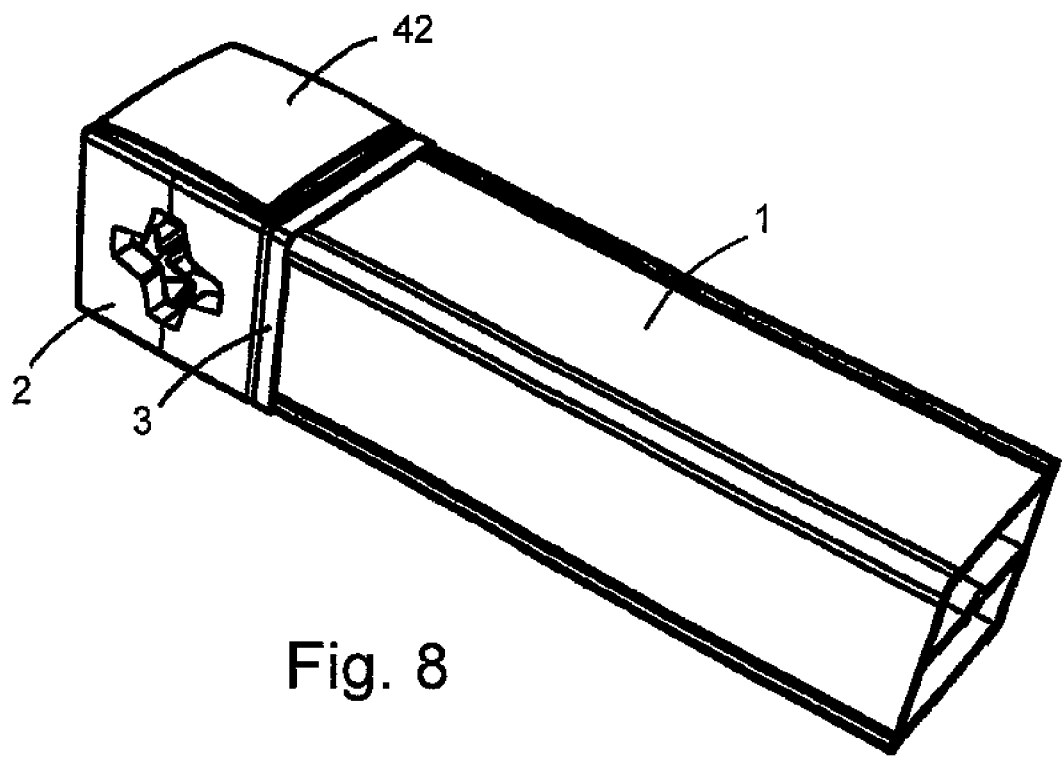
FIG. 8 is a general view of the connector with a cap applied to the node fitting.

Any unused apertures in the node fitting can be covered by a molded cap 42, as shown in FIGS. 8 and 9, to prevent ingress of dirt and improve the overall appearance of the display. The cap includes a slightly domed square cover plate 43 with a projecting continuous wall 44 of cruciform shape to locate in one of the apertures 33. Each lobe 45 of the wall 44 is provided with external ribs 46 extending perpendicular to the cover plate 43 to form an interference fit in the apertures 33 so that the caps can be applied by an easy push-fit.

FIG. 10 shows a threaded male fitting which can be used with the node fittings. The threaded fitting is similar to the male end fittings 3, including a plate 54 formed with a cylindrical stem 58 projecting axially from the center of the plate. The stem carries a cruciform head 59 which comprises four radially-projecting noses 60 project radially from the stem 58 on the diagonals of the end plate 54, similar in structure to the noses 10 of the end fittings 3. However, the stem 58 incorporates a screw-threaded socket 62 which opens through the plate 54 to receive a screw-threaded element (not shown). The socket may be formed by molding or, for greater strength, by incorporating a screw-threaded bush into the molding. When the threaded fittings are engaged with a node fitting 2 as described, accessories such as shelves, feet or other items can conveniently be attached to the frame by means of bolts or threaded studs inserted into the sockets 62.

While the above description places emphasis on the areas which are believed to be new and addresses specific problems which have been identified, it is intended that the features disclosed herein may be used in any combination which is capable of providing a new and useful advance in the art.

The invention claimed is:

1. A connector for use in displays of the kind which include a display frame formed of a plurality of beams which are joined together by multi-way node fittings to form a three-dimensional shape and which have display panels releasably secured to the beams, said connector comprising:
 a male part secured to a beam such that the male part and the beam are rotationally and axially fixed relative to one another, the male part comprising a first side having a bearing face, a stem rotationally and axially fixed to and projecting directly from the bearing face, a head comprising four noses which project laterally from the stem, and a second side opposite the first side with projections that locate within an open end of the beam on opposite sides of a central web thereof, the stem comprising an axial bore through its center which receives a fastening element engaged in an axial channel in the central web of the beam; and
 a female part having a wall with an inner face and an outer bearing face, the wall containing an aperture which permits the head of the male part to pass through the aperture and rotatably receives the stem with the bearing face of the male part in contact with the outer bearing face of the wall, the inner face of each wall being profiled to engage the noses when the male part is rotated within the aperture, and the outer bearing face of the wall being disposed outside of the aperture;
 wherein the aperture of the female part is of cruciform shape and the inner face of the wall or each nose is profiled to provide progressive tightening and alignment and to engage said noses with said inner face of the wall when the beam to which is secured said male part is rotated in either a clockwise or a counter-clockwise direction, the male part passing through the aperture in a first orientation and the progressive tightening occurring as the male part is rotated from the first orientation to an engaged orientation.

2. A connector according to claim 1 in which the noses comprise oppositely-inclined ramps which subtend a radially-extending locating ridge.

3. A connector according to claim 2 in which the inner face of the wall is provided with a radially-extending groove which receives the locating ridge to positively locate the male part within the female part.

4. A connector according to claim 3 and further configured such that the locating ridge clicks, in use, into the groove indicating that a positive lock has been achieved.

5. A connector according to claim 1, wherein the wall of the female part is square in plan with four surrounding straight side edges, the aperture having four substantially identical lobes which project generally perpendicular to the four surrounding straight side edges of the wall, each lobe comprising opposite side margins which converge to meet a circumferential outer margin.

6. A connector according to claim 5, in which the bearing face of the male part is provided by a plate, wherein the plate is square in plan, the noses projecting radially from the stem on the diagonals of the plate.

7. A connector according to claim 1 in which the bearing face of the male part is provided by a plate.

8. A connector according to claim 7 in which the plate comprises the first side and the second side opposite the first side.

9. A connector according to claim 1, wherein the female part is forming in two identical halves joined together by one or more fastening elements.

10. A connector according to claim 9, wherein each half has a cooperating hole, the one or more fastening elements being configured to be inserted through cooperating holes to join the two halves together.

11. A connector according to claim 1 in which the female part includes a plurality of walls which each contain such an aperture.

12. A connector for use in displays of the kind which include a display frame formed of a plurality of beams which are joined together by multi-way node fittings to form a three-dimensional shape and which have display panels releasably secured to the beams, said connector comprising:
 a male part having a first side with a bearing face, a stem rotationally and axially fixed to and projecting directly from the bearing face, a head comprising four noses which project laterally from the stem, and a second side opposite the first side with projections configured to locate within an open end of a beam on opposite sides of a central web of the beam; and
 a female part having a wall with an inner face and an outer bearing face, the wall containing an aperture which permits the head of the male part to pass through the aperture and rotatably receives the stem with the bearing face of the male part in contact with the outer bearing face of the wall, the inner face of each wall being profiled to engage the noses when the male part is rotated within the aperture, and the outer bearing face of the wall being disposed outside of the aperture;
 wherein the aperture of the female part is of cruciform shape and the inner face of the wall or each nose is profiled to provide progressive tightening and alignment and to engage said noses with said inner face of the wall when the male part is rotated in either a clockwise or a counter-clockwise direction, the male part passing through the aperture in a first orientation and the progressive tightening occurring as the male part is rotated from the first orientation to an engaged orientation.

13. A connector according to claim 12 in which the noses comprise oppositely-inclined ramps which subtend a radially-extending locating ridge.

14. A connector according to claim 13 in which the inner face of the wall is provided with a radially-extending groove which receives the locating ridge to positively locate the male part within the female part.

15. A connector according to claim 14 and further configured such that the locating ridge clicks, in use, into the groove indicating that a positive lock has been achieved.

16. A connector according to claim 12, wherein the wall of the female part is square in plan with four surrounding straight side edges, the aperture having four substantially identical lobes which project generally perpendicular to the four surrounding straight side edges of the wall, each lobe comprising opposite side margins which converge to meet a circumferential outer margin.

17. A connector according to claim 12 in which the bearing face of the male part is provided by a plate.

18. A connector according to claim 12, wherein the female part is formed in two identical halves joined together by one or more fastening elements.

19. A connector for use in displays of the kind which include a display frame formed of a plurality of beams which are joined together by multi-way node fittings to form a three-dimensional shape and which have display panels releasably secured to the beams, the connector comprising:

a male part secured to a beam such that they are rotationally and axially fixed relative to one another, the male part having a bearing face, a stem projecting from the bearing face and a head comprising four noses which project laterally from the stem, the stem comprising an axial bore through its center which receives a fastening element engaged in an axial channel in a central web of the beam; and a female part having a wall with an inner face and an outer bearing face, the wall containing an aperture of cruciform shape which permits the head of the male part to pass through the aperture when the male part is in a first orientation and which rotatably receives the stem with the bearing face of the male part in contact with the outer bearing face of the wall, the inner face of the wall being profiled to engage the noses when the male part is rotated within the aperture;

wherein the inner face of the wall or each nose is profiled to provide progressive tightening and alignment of the connector as the beam and the bearing face and the stem and the noses of the male part are rotated together, in use, in either direction from the first orientation to a second, engaged orientation to engage the female part.

20. A connector according to claim 19, wherein the male part comprises a first side with said bearing face and a second side opposite the first side, the second side comprising a plurality of projections located within an open end of the beam on opposite sides of the central web.

\* \* \* \* \*